United States Patent
Saito et al.

(10) Patent No.: US 11,346,403 B2
(45) Date of Patent: May 31, 2022

(54) ROTATION BRAKING DEVICE

(71) Applicant: NTN CORPORATION, Osaka (JP)

(72) Inventors: Takahide Saito, Shizuoka (JP); Koji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 54 days.

(21) Appl. No.: 17/041,236

(22) PCT Filed: Mar. 19, 2019

(86) PCT No.: PCT/JP2019/011402
§ 371 (c)(1),
(2) Date: Sep. 24, 2020

(87) PCT Pub. No.: WO2019/188576
PCT Pub. Date: Oct. 3, 2019

(65) Prior Publication Data
US 2021/0095724 A1    Apr. 1, 2021

(30) Foreign Application Priority Data

Mar. 26, 2018 (JP) .............................. JP2018-057446

(51) Int. Cl.
*F16D 27/112*    (2006.01)
*F16D 1/10*    (2006.01)
(Continued)

(52) U.S. Cl.
CPC .............. *F16D 27/112* (2013.01); *F16D 1/10* (2013.01); *F16D 41/088* (2013.01); *H01F 7/08* (2013.01);
(Continued)

(58) Field of Classification Search
CPC ...... F16D 1/10; F16D 2001/103; F16D 27/02; F16D 27/04; F16D 27/06; F16D 27/10;
(Continued)

(56) References Cited

U.S. PATENT DOCUMENTS

| 7,063,194 B2* | 6/2006 | Hori ........................ F16D 27/10 |
| | | 192/35 |
| 2002/0170795 A1* | 11/2002 | Yasui ...................... F16D 27/10 |
| | | 192/35 |

(Continued)

FOREIGN PATENT DOCUMENTS

| JP | 2004-308784 | 11/2004 |
| JP | 2005-249003 | 9/2005 |

(Continued)

OTHER PUBLICATIONS

International Search Report dated Apr. 16, 2019 in International (PCT) Patent Application No. PCT/JP2019/011402.

(Continued)

*Primary Examiner* — Richard M Lorence
(74) *Attorney, Agent, or Firm* — Wenderoth, Lind & Ponack, L.L.P.

(57) ABSTRACT

A rotation braking device includes a clutch mechanism disposed between an inner member and an outer member. The clutch mechanism includes an electromagnetic actuator which controls relative rotation of the cage such that, due to the relative rotation, engaging elements are moved between an engaged position and a neutral position. An armature is rotationally fixed relative to the cage, and can be directly magnetically attracted to an electromagnet which is rotationally fixed relative a housing that houses the clutch mechanism. The outer member is directly supported in a radial direction by the housing and engages the housing so as to limit relative rotation relative to each other.

22 Claims, 4 Drawing Sheets

(51) Int. Cl.
  *F16D 41/08*   (2006.01)
  *H01F 7/08*    (2006.01)
  *F16D 121/20*  (2012.01)
  *F16D 49/00*   (2006.01)
  *F16D 51/00*   (2006.01)
  *F16D 65/16*   (2006.01)

(52) U.S. Cl.
  CPC .............. *F16D 49/00* (2013.01); *F16D 51/00* (2013.01); *F16D 65/16* (2013.01); *F16D 2001/103* (2013.01); *F16D 2121/20* (2013.01)

(58) Field of Classification Search
  CPC .... F16D 27/102; F16D 27/108; F16D 27/112; F16D 41/067; F16D 41/088; F16D 47/04; F16D 49/00; F16D 51/00; F16D 65/16; F16D 2121/20; F16D 2125/38; H01F 7/08; H01F 7/1638
  USPC .......................................................... 192/35
  See application file for complete search history.

(56) References Cited

U.S. PATENT DOCUMENTS

2007/0170029 A1   7/2007   Okada et al.
2013/0299298 A1  11/2013   Akiyoshi et al.

FOREIGN PATENT DOCUMENTS

| JP | 2007-247713 | 9/2007 |
| JP | 2008-121715 | 5/2008 |
| JP | 2009-8172   | 1/2009 |
| JP | 2012-149746 | 8/2012 |

OTHER PUBLICATIONS

International Preliminary Report on Patentability dated Sep. 29, 2020 in International (PCT) Patent Application No. PCT/JP2019/011402.

* cited by examiner

ROTATION BRAKING DEVICE

TECHNICAL FIELD

The present invention relates to a rotation braking device used for a first braking operation for stopping rotation and a second braking operation for applying resistance force that prevents rotation.

BACKGROUND ART

Known rotation transmission devices for transmitting rotational torque between two members that rotate relative to each other include an inner member, an outer member having an inner peripheral portion disposed outside of the inner member, a clutch mechanism for transmitting and blocking rotational torque between the inner member and the outer member, and a housing that houses the clutch mechanism. The clutch mechanism includes engaging elements disposed between the inner peripheral portion of the outer member and the inner member, a cage that retains the engaging elements, and an electromagnetic actuator that controls rotation of the cage relative to the inner member. The engaging elements are movable, due to rotation of the cage relative to the inner member, between an engaged position where the engaging elements engage the outer member and the inner member, and a neutral position where the engaging elements are disengaged.

For example, the rotation transmission device as disclosed in JP Patent publication 2007-247713A includes a switch spring, an electromagnet, a rotor, and an armature. The switch spring is elastically deformed by rotation of the cage relative to the inner member so as to allow rotation of the cage toward its original position with the restoring elasticity of the switch spring, thereby moving the engaging elements to the neutral position. The armature is supported so as to be movable in the axial direction, and is also prevented from rotating relative to the cage. The rotor is rotationally fixed relative to the outer member. When the armature is attracted to the rotor by energizing the electromagnetic coil of the electromagnet, the cage is connected to the outer member via the armature and the rotor, and relative rotation between the cage and the inner member causes the engaging elements to engage a cylindrical surface of the outer member and cam surfaces of the inner member so that rotational torque is transmitted between the inner member and the outer member. When the electromagnetic coil is de-energized, the cage is rotated toward its original position by the spring force of the switch spring, and the engaging elements are circumferentially pressed by the cage, and moved to the neutral position.

In the rotation transmission device as in JP Patent publication 2007-247713A, the electromagnetic actuator of the clutch mechanism includes a rotor integrated with the outer member via a rotor guide, and configured to bring the armature, which rotates continuously and limitlessly together with an inner member, into contact with the rotor with the magnetic attraction force of the electromagnet, which is non-rotatably supported by the housing. This structure is formed on the premise that when the clutch mechanism transmits rotational torque, unlimited rotation is allowed between the inner member and the outer member. Therefore, the outer member is supported by the housing via a rolling bearing, and the rolling bearing is prevented from axially coming off by a retaining ring attached to the inner periphery of the housing and a retaining ring attached to the outer periphery of the outer member.

The inventors of the present application have examined the use of the rotation transmission device as in JP Patent publication 2007-247713A as a rotation braking device for a first braking operation for stopping rotation inputted to the inner member while the outer member is stationary, or for a second braking operation for applying resistance force against rotation inputted to one of the inner member and the outer member when the rotation angle of the outer member is mall (e.g., one revolution or less), and have found out that the number of parts is large and there is room for improvement in terms of cost.

Therefore, an object of the present invention is to provide a rotation braking device suitable for the first braking operation for stopping rotation inputted to one of the inner member and the outer member and for the second braking operation where the rotation angle of the outer member is small.

SUMMARY OF THE INVENTION

In order to achieve the above object, the present invention provides a rotation braking device comprising: an inner member; an outer member having an inner peripheral portion disposed outside the inner member; a clutch mechanism that selectively transmits and blocks rotational torque between the inner member and the outer member; and a housing that houses the clutch mechanism, wherein the clutch mechanism includes engaging elements disposed between the inner peripheral portion of the outer member and the inner member, a cage retaining the engaging elements, and an electromagnetic actuator that controls the clutch mechanism, the engaging elements are movable, by relative rotation of the cage, between an engaged position where the engaging elements engage the inner peripheral portion of the outer member and the inner member, and a neutral position where the engaging elements are disengaged from the inner peripheral portion of the outer member and the outer member, the electromagnetic actuator includes an armature rotationally fixed relative to the cage, and an electromagnet facing the armature, the electromagnet is rotationally fixed relative to the housing, the armature is a movable member configured to be directly magnetically attracted to the electromagnet by energizing the electromagnet, the outer member is directly supported in a radial direction by the housing, and the outer member and the housing include a pair of engaging portions engageable with each other so as to limit relative rotation of the outer member and the housing.

In this arrangement, when the electromagnet is energized, a series of torque transmission paths is formed between the inner member and the outer member by the clutch mechanism and between the outer member and the housing by the pair of engaging portions. Therefore, by connecting an output side of the device, i.e., its portion downstream of the clutch mechanism with respect to the flow of energy, to, for example, an external stationary member, movable member, deformable member, etc. such that the output side is capable of relatively resisting rotational torque of the input side, it is possible to perform the first braking operation for stopping rotation of the inner member or the outer member on the input side, or perform the second braking operation for applying resistance force against rotation of the inner member or the outer member on the input side. During the above-mentioned first braking operation or the above-mentioned second braking operation under a use condition in which the rotation angle of the outer member is small, relative rotation that indefinitely continues does not occur between the outer member and the housing, so that radially supporting the outer member on the housing with a rolling bearing will result in an excessive support structure. Therefore, by directly and radially supporting the outer member on the housing, it is possible to reduce the number of parts. Further, in the electromagnetic actuator, by directly magnetically attracting the armature to the electromagnet, compared to a case where the armature is magnetically attracted via the rotor, magnetic force loss in the rotor is eliminated and magnetic attraction to the armature is increased. As a result, the rotation braking device shows improved responsiveness, which is important in first and second braking operations, and also, it is possible to reduce the number of parts.

Specifically, the pair of engaging portions are preferably constituted by an engaging protrusion formed on one of the outer member and the housing, and an engaging recess formed on the other of the outer member and the housing. In this arrangement, relative rotation between the housing and the outer member can be limited simply by forming a protrusion and a recess on the housing and the outer member.

Preferably, the pair of engaging portions are disposed outwardly of the engaging elements. In this arrangement, because the engaged position between the engaging elements and the outer member and the engaged position between the outer member and the housing are aligned with each other in the radial direction, twisting between these engaged portions can be avoided.

Preferably, the electromagnet includes a field core supported by the housing, the field core and the housing include a pair of rotation prevention portions fitted to each other so as not to be rotatable relative to each other, the pair of rotation prevention portions being constituted by a fitting protrusion formed on one of the field core and the housing, and a fitting recess formed on the other of the field core and the housing. With this arrangement, the electromagnet can be directly and non-rotatably supported relative to the housing simply by forming of a protrusion and a recess on the housing and the field core.

Preferably, the rotation braking device further includes an O-ring that provides a seal between the housing and the outer member. As mentioned above, when relative rotation that indefinitely continues does not occur between the outer member and the housing, using an oil seal with a seal lip will result in excessive sliding resistance. Therefore, using an O-ring can reduce the cost.

Preferably, the rotation braking device further includes a retaining ring attached to the housing and axially abutting the outer member. In this arrangement, compared to a retaining structure that restricts inner and outer rings of a rolling bearing disposed between the outer member and the housing with a retaining ring on the housing side and a retaining ring on the outer member side, it is possible to prevent the outer member from being pulled out of the housing.

As described above, according to the present invention, the number of parts can be reduced and responsiveness can be enhanced by adopting the above-described configuration. Accordingly, a rotation braking device can be provided suitable for a first braking operation for stopping rotation inputted to one of an inner member and an outer member and a second braking operation when the rotation angle of the outer member is small.

DETAILED DESCRIPTION OF THE INVENTION

Figure 1:
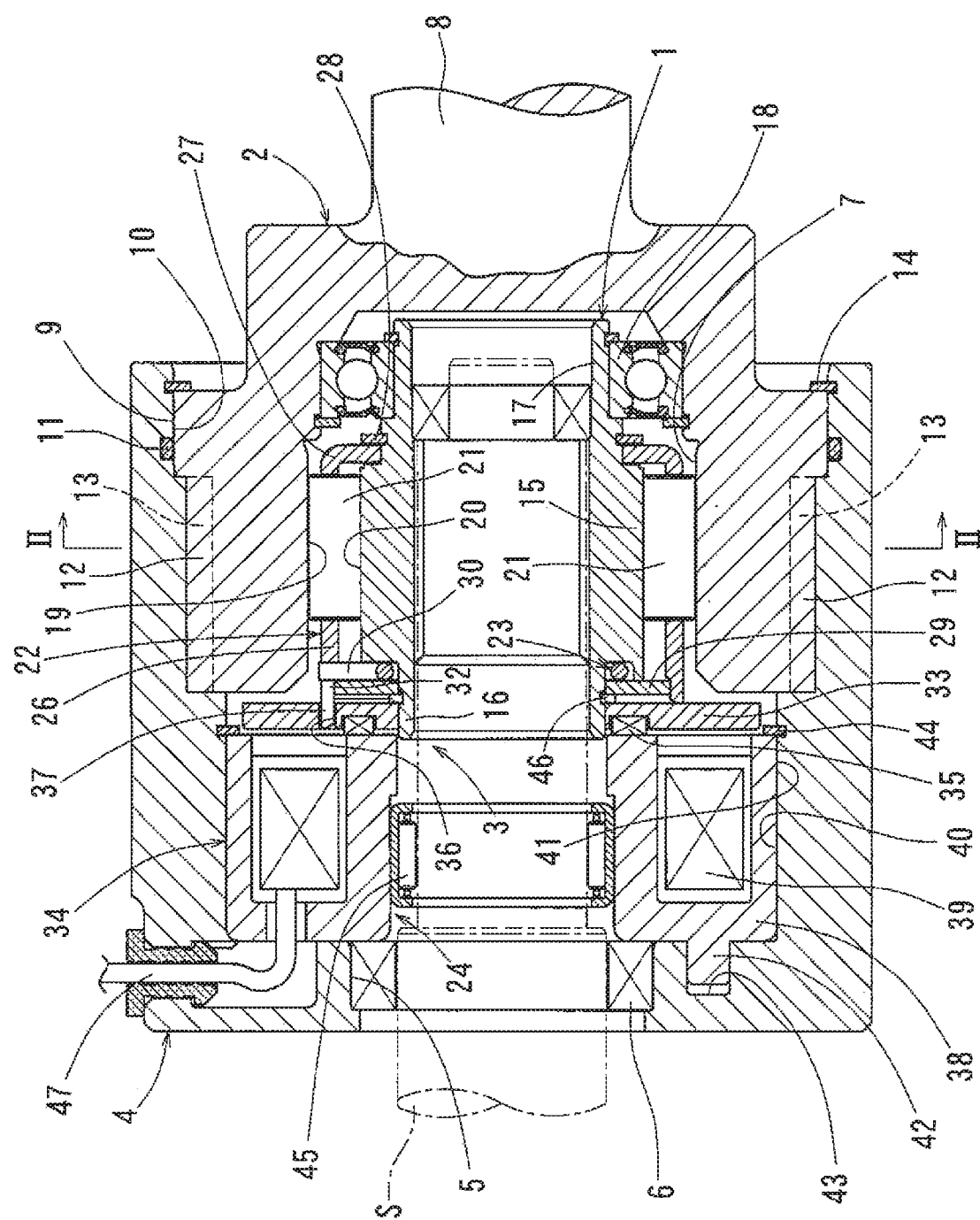
FIG. 1 is a sectional view showing an overall configuration of a rotation braking device according to a first embodiment of the present invention.
Figure 2:
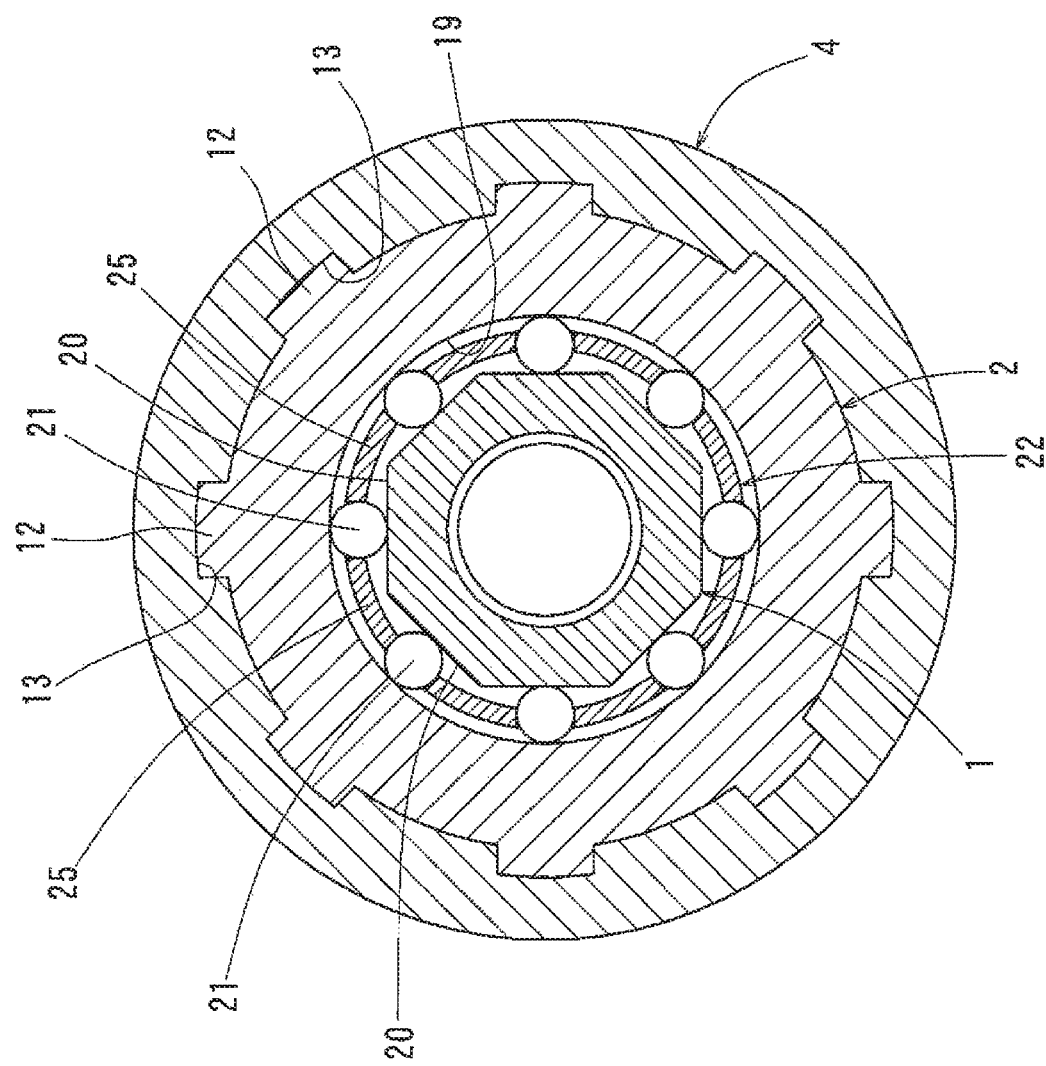
FIG. 2 is a sectional view taken along line II-II in FIG. 1.

A first embodiment as an example of the present invention will be described with reference to FIGS. 1 to 3. As shown in FIGS. 1 and 2, the rotation braking device according to the first embodiment includes an inner member 1, an outer member 2 arranged coaxially with the inner member 1, a clutch mechanism 3 disposed between the inner member 1 and the outer member 2 to selectively transmit and block rotational torque from the inner member 1 to the outer member 2, and a housing 4 that houses the clutch mechanism 3.

As used herein, the terms "axial" and "axially" are related to the direction along an axis (rotation center axis) of the inner member 1 and the outer member 2; the terms "radial" and "radially" are related to a direction orthogonal to the axial direction; and the terms "circumferential" and "circumferentially" are related to the circumferential direction around the axis.

One of the inner member 1 and the outer member 2 serves as a member for inputting rotational torque to the clutch mechanism 3, and the other is a member to which the rotational torque is transmitted from the clutch mechanism 3.

The clutch mechanism 3 is electromagnetically switchable between an engaged position in which the rotational torque is transmitted and a disengaged position in which the transmission of the rotational torque is blocked.

The housing 4 is constituted by a single tubular member having openings at both ends in the axial direction. The housing 4 is made of a non-magnetic material in order to suppress absorption of magnetic force generated electromagnetically in the clutch mechanism 3. Examples of such non-magnetic materials include aluminum alloys.

The inner member 1 is formed in a hollow shaft shape. A shaft S is connected to an inner periphery of the inner member 1. The shaft S is inserted through an opening 5 on one axial side (left side in FIG. 1) of the housing 4. A seal or a bearing 6 is disposed between the opening 5 of the housing 4 and the shaft S. If a seal 6 is used, it provides a seal between the shaft S and the housing 4. If a bearing 6 is used, it rotatably supports the shaft S relative the housing 4. The bearing may be a sealed rolling bearing so that it also serves as a seal.

The outer member 2 includes an inner peripheral portion 7 disposed outside the inner member 1, a shaft portion 8 extending outward from the other axial side (right side in FIG. 1) of the housing 4, and a circular outer peripheral portion 9 located outwardly of the inner peripheral portion 7.

The inner peripheral portion 7 of the outer member 2 includes a portion to which rotational torque is transmitted from the clutch mechanism 8. In order to ensure the strength of the inner peripheral portion 7 against the rotational torque and ensure the transmission capacity of the clutch mechanism 3, an outer diameter of the outer member 2 is maximized outside the inner peripheral portion 7 and is larger than the inner diameter of the opening 5 of the housing 4.

The shaft portion 8 of the outer member 2 is used for connection with other members. While an example is shown in which the inner peripheral portion 7 and the shaft portion 8 are formed in a single member as the outer member 2, the shaft portion is not essential for the outer member, and for example, another shaft may be connected to the outer member. Alternatively, the housing may be fixed to another stationary member and the outer member may be fixed only to the housing, or the outer member may be fixed to another stationary member. While in the example shown, the inner member 1 is connected to the shaft S, the inner member may be integrally formed with a shaft portion, and the shaft portion may be connected to another component. The connecting means therefor is not particularly limited, and examples thereof include serration fitting, spline fitting, and key connection.

The circular outer peripheral portion 9 of the outer member 2 is formed integrally with the inner peripheral portion 7. The circular outer peripheral portion 9 is located on a flange-shaped outer periphery formed on the outer member 2. The circular outer peripheral portion 9 includes a radially outer surface that defines a maximum outer diameter of the outer member 2.

The housing 4 has a circular inner peripheral portion 10 outside the circular outer peripheral portion 9 of the outer member 2. The circular outer peripheral portion 9 and the circular inner peripheral portion 10 are fitted to each other on both axial sides thereof around the entire circumference thereof. An O-ring 11 is disposed axially between these fitted portions.

The outer member 2 is radially and directly supported by the housing 4 at the fitted portions between the circular outer peripheral portion 9 of the outer member 2 and the circular inner peripheral portion 10 of the housing 4.

The O-ring 11 provides a seal between the outer member 2 and the housing 4. The O-ring 11 is an annular packing having an O-shaped (circular) cross section. The O-ring 11 prevents foreign matter from entering from outside and leakage of fluid lubricant from inside of the housing 4 to the outside. The fluid lubricant is, for example, grease preliminarily sealed in the housing 4. While an example is shown in which a seal groove for holding the O-ring 11 is formed on the circular inner peripheral portion 10 of the housing 4, the seal groove may be formed on a circular outer peripheral portion of the outer member 2.

The outer member 2 and the housing 4 have pairs of engaging portions 12 and 13 which are engageable with each other so as to limit relative rotation of the outer member 2 and the housing 4. Each pair of engaging portions 12 and 13 are composed of an engaging protrusion formed on one of the outer member 2 and the housing 4, and an engaging recess formed on the other.

The engaging portions 12, which are engaging protrusions, are located on the outer periphery of the outer member 2 and is formed integrally with the inner peripheral portion 7. The engaging portions 12 are ribs each having a pair of circumferential end surfaces extending in the axial direction on both circumferential sides of the rib. The engaging portions 13, which are engaging recesses, are formed on the inner periphery of the housing 4. The engaging portions 13 are grooves extending in the axial direction and each having a sectional shape that fits into the corresponding engaging portion 12.

The protruding shapes of the engaging portions 12 and the groove shapes of the engaging portions 13 define parallel keys.

The plurality of engaging portions 12 of the outer member 2 are disposed on one axial side of the circular outer peripheral portion 9 and are circumferentially spaced apart from each other. The engaging portions 12 form spline shafts on the outer periphery of the outer member 2. The plurality of engaging portions 13 of the housing 4 are disposed at positions corresponding to the engaging portions 12. The engaging portions 13 form spline holes on the inner periphery of the housing 4. Through spline fitting by the plurality of pairs of engaging portions 12 and 13, the outer member 2 and the housing 4 are connected to each other such that they cannot rotate relative to each other. Therefore, the outer member 2 and the housing 4 can always rotate in unison with each other in both clockwise and counterclockwise directions in FIG. 2. The outer member 2 is radially and directly supported by the housing 4 at the spline fitting portions, too.

Although spline fitting is exemplified as a structure for connecting the outer member 2 and the housing 4 such that they cannot rotate relative to each other, pairs of engaging portions that form a different protrusion-recess fitting structure, such as serration fitting or key fitting, may be used instead. While an example is shown in which the pairs of engaging portions 12 and 13 are disposed between the outer periphery of the outer member 2 and the inner periphery of the housing 4, provided the pairs of engaging portions are engageable in the circumferential direction, they may be disposed at different locations. For example, the pairs of engaging portions may be disposed on an end surface of the housing on its other axial side and an outer flange portion of the outer member facing the end surface, so as to mesh with each other.

As shown in FIG. 1, the ends of the engaging portions 12 on the one axial side thereof are radially aligned with the end of the inner peripheral portion 7 on the one axial side thereof. The portions of the engaging portions 12 on the other axial side thereof are continuous to each other into a flange shape forming the circular outer peripheral portion 10. The diameter of an imaginary circle circumscribing the engaging portions 12 is smaller than the outer diameter of the circular outer peripheral portion 9. The engaging portions 13 can abut the flange shape of the outer member 2 at the other axial ends of the engaging portions 13. The engaging portions 13 are closed at the one axial ends thereof, and the engaging portions 12 can abut the closed ends of the engaging portions 13. Movement of the outer member 2 in the one axial direction relative to the housing 4 is limited by the axial abutment of the outer member 2 against the housing 4.

Movement of the outer member 2 in the other axial direction relative to the housing 4 is limited by a retaining ring 14. The retaining ring 14 is attached to a retaining ring groove formed on the inner periphery of the housing 4, and configured to axially abut the outer member 2.

The inner member 1 includes a cam ring portion 15 protruding in the radial direction at an axially intermediate position of the inner member 1, a first end portion 16 located on the one axial side of the cam ring portion 15, and a second end portion 17 located on the other axial side of the cam ring portion 15. A bearing 18 is disposed between the outer periphery of the second end portion 17 and the inner peripheral portion 7 of the outer member 2. The bearing 18 rotatably supports the inner member 1 relative to the outer member 2.

As shown in FIGS. 1 and 2, the clutch mechanism 3 includes a cylindrical surface 19 provided on the inner peripheral portion 7 of the outer member 2, cam surfaces 20 provided on the outer periphery of the cam ring portion 15 of the inner member 1, engaging elements 21 disposed between the cylindrical surface 19 and the respective cam surfaces 20, a cage 22 retaining the engaging elements 21, a switch spring 23 retaining the phase of the cage 22 with the spring force thereof, and an electromagnetic actuator 24 configured to control engagement and disengagement of the clutch mechanism 3.

The cylindrical surface 19 extends continuously around the entire circumference. Wedge spaces are defined between the respective cam surfaces 20 and the cylindrical surface 19. Each wedge space is gradually narrowed from the circumferential center of the cam surface 20 to both circumferential ends thereof. That is, the radial distance between the cam surface 20 and the cylindrical surface 19 gradually decreases in one circumferential direction (counterclockwise direction in FIG. 2) from the position of the engaging element 21 in FIG. 2 located in the circumferential center of the cam surface 20, and also gradually decreases from the above position of the engaging element 21 in the opposite circumferential direction (clockwise direction in FIG. 2).

While, in the example shown, each cam surface 20 is a single flat surface, the cam surface may be constituted by a plurality of flat surface portions or may be a single curved surface. While, in the example shown, the cylindrical surface 19 is formed on the outer member 2, it is possible to form the cylindrical surface on the inner member and form the cam surfaces on the inner peripheral portion of the outer member.

The plurality of cam surfaces 20 on the outer periphery of the inner member are formed at intervals in the circumferential direction. The engaging elements 21 are each received in one of the plurality of wedge spaces.

The engaging elements 21 have a cylindrical roller shape, and are movable, due to rotation of the cage 22 relative to the cam surfaces 20, between an engaged position where the engaging elements 21 engage the cylindrical surface 19 and the cam surfaces 20, and a neutral position where the engaging elements 21 are disengaged from the cylindrical surface 19 and the cam surfaces 20. The engaging elements 21 engage the cylindrical surface 19 and the cam surfaces 20 when the cage 22 rotates relative to the inner member 1, thereby transmitting rotational torque between the inner member 1 and the outer member 2.

The cylindrical surface 19, the cam surfaces 20, and the engaging elements 21 are radially aligned with the pairs of engaging portions 12 and 13. That is, the pairs of engaging portions 12 and 13 are located outwardly of the engaging elements 21.

The cage 22 includes a plurality of pillars 25 aligned in the circumferential direction, a first annular portion 26 continuous to the one axial sides of the pillars 25, and a second annular portion 27 continuous to the other axial sides of the pillars 25. Each engaging element 21 is received in the space between a respective circumferentially adjacent pair of pillars 25. Due to contact with the respective circumferentially opposed pillars 25, the circumferential positions of the engaging elements 21 relative to the cam surfaces 20 are restricted, and also, the engaging elements 21 are forcibly rotated together with the cage 22.

The second annular portion 27 of the cage 22 has an inwardly extending flange. The second annular portion 27 is, at the inner peripheral portion of the flange, rotatably fitted to the outer periphery of the second end portion 17 of the inner member 1. The cage 22 is axially positioned, at the flange of the second annular portion 27, by the cam ring portion 15 and a retaining ring 28. The retaining ring 28 is attached to a retaining ring groove formed in the second end portion 17.

The overall shape of the cage 22 is formed by, for example, press working using a metal plate as a raw material or powder metallurgy. When the overall shape of the cage 22 is formed by press working, a steel plate may be used as the metal plate, for example.

The switch spring 23 is an elastic member which is configured to be elastically deformed by the rotation of the cage 22 relative to the inner member 1 so as to allow rotation of the cage 22 toward its original position with the restoring elasticity of the elastic member, thereby elastically retaining the cage 22 at a position where the engaging elements 21 are in the neutral position. The switch spring 23 is disposed on the first end portion 16 of the inner member 1. The clutch mechanism 3 has a spring retaining ring 29 that keeps the switch spring 23 on the first end portion 16.

The switch spring 23 is a metal spring including a C-shaped ring portion, and a pair of engaging pieces 30 extending outwardly from both ends of the C-shaped ring portion. The ring portion of the switch spring 23 is passed over the outer periphery of the first end portion 16 and fitted into a recess 31 formed in the inner member 1. The recess 31 is formed in the end surface of the cam ring portion 15 and has a predetermined depth in the axial direction. The pair of engaging pieces 30 of the switch spring 23 are inserted through a cutout formed in the outer wall of the recess 31 into a cutout 32 formed in the first annular portion 26 of the cage 22. The pair of engaging pieces 30 of the switch spring 23 press the cutout of the recess 31 and the cut-away part 32 of the cage 22 in opposite circumferential directions, respectively, thereby retaining the cage 22 in the phase in which the engaging elements 21 are in the neutral position.

The spring retaining ring 29 is fitted to the outer periphery of the first end portion 16 of the inner member 1 and the inner periphery of the first annular portion 26 of the cage 22. The spring retaining ring 29 is prevented from moving in the one axial direction by a retaining ring 46 attached to the outer periphery of the first end portion 16. Thus, the spring retaining ring 29 prevents the switch spring 23 from coming out of the recess 31.

The electromagnetic actuator 24 includes an armature 33 that axially faces the first annular portion 26 of the cage 22, an electromagnet 34 that axially faces the armature 33, and a separation spring 36 that presses the armature 33 away from the electromagnet 34.

Figure 3:
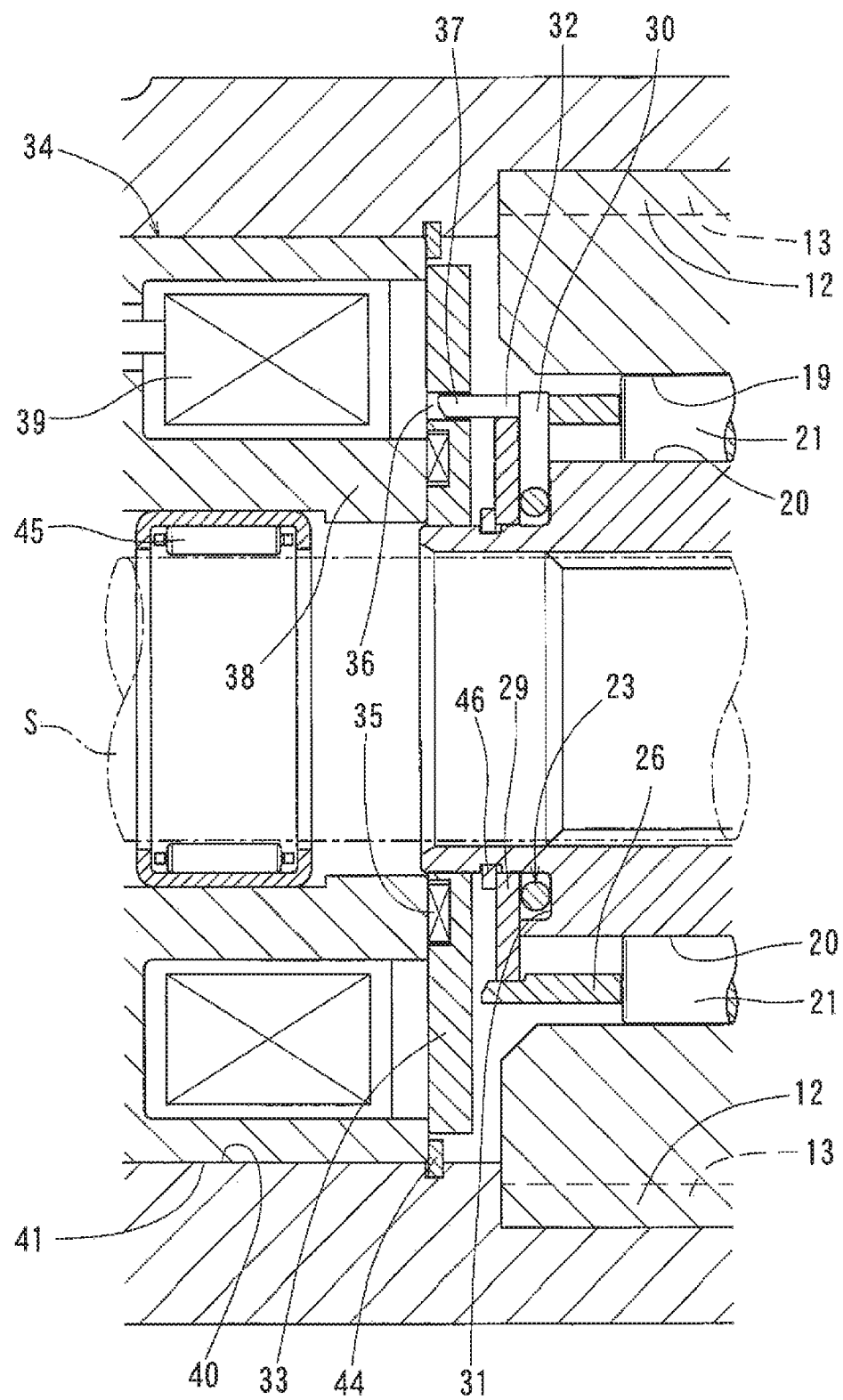
FIG. 3 is a partial sectional view showing an armature in FIG. 1 being magnetically attracted by an electromagnet.

As shown in FIGS. 1 and 3, the armature 33 is a movable member slidably fitted to the outer periphery of the first end portion 16 of the inner member 1. The armature 33 is prevented from rotating relative to the cage 22. The armature 33 is formed with an engagement hole 36 for preventing rotation. The cage 22 has a projecting piece 37 extending from the first annular portion 26 into the engagement hole 36. The projecting piece 37 is engageable with the engagement hole 36 in the circumferential direction in the entire range of the stroke of the armature 33. Due to this engagement, the armature 33 is prevented from rotating, while being axially movable, relative to the retainer 22. As an alternative means for preventing such relative rotation, a connecting plate may be disposed between the armature and the cage.

The electromagnet 34 includes a field core 38 supported by the housing 4, and an electromagnetic coil 39 supported by the field core 38. The electromagnet 34 is supported so as not to be rotatable relative to the housing 4.

The field core 38 is made of a ferromagnetic material so that the filed core functions as a yoke. The field core 38 integrally includes an inner tubular portion that extends in the axial direction, an outer tubular portion that extends in the axial direction at a position outside the inner tubular portion, and a tube bottom portion that connects together the one axial sides of the inner tubular portion and the outer tubular portion. The electromagnetic coil 39 is disposed in the space between the inner tubular portion and the outer tubular portion of the field core 38. The electromagnetic coil 39 is fixed to the field core by an appropriate means such as by filling the space with resin, by adhesion or by winding the electromagnetic coil 39 around the field core.

The housing 4 and the field core 38 are fitted to each other at fitting surfaces 40 and 41 thereof. Thus, the field core 38 is radially supported relative to the housing 4. The fitting surface 40 of the housing 4 is a cylindrical surface on the inner periphery of the housing 4, and the fitting surface 41 of the field core 38 is a cylindrical surface on the outer periphery of the outer tubular portion.

The tube bottom portion of the field core 38 axially abuts an end wall of the housing 4 which defines the opening 5 of the housing 4. Thus, the field core 38 is axially supported so as not to be movable in the one axial direction relative to the housing 4.

The field core 38 and the housing 4 have a pair of rotation prevention portions 42 and 43, respectively, which are fitted to each other so as not to be rotatable relative to each other. The pair of rotation prevention portions 42 and 43 are constituted by a fitting protrusion formed on one of the field core 38 and the housing 4, and a fitting recess formed on the other. The rotation prevention portion 42, which is a fitting protrusion, is formed integrally with the field core 38. The rotation prevention portion 42 has a columnar shape that protrudes in the one axial direction from one circumferential location of the tube bottom portion of the field core 38. On the other hand, the rotation prevention portion 43, which is a fitting recess, is formed integrally with the end wall of the housing defining the opening 5 of the housing 4. The rotation prevention portion 43 is a round hole having a diameter corresponding to the diameter of the rotation prevention portion 42 such that the rotation prevention portions 42 and 43 can be fitted together. The electromagnet 34 is prevented from rotating with respect to the housing 4 by fitting together the pair of rotation prevention portions 42 and 43.

While, in the example shown, the rotation prevention portion 42, or the fitting protrusion, is formed on the field core 38, and the rotation prevention portion 43, or the fitting recess, is formed on the housing 4, the fitting protrusion may be formed on the housing and the fitting recess may be formed on the field core.

While, in the example shown, the pair of rotation prevention portions 42 and 43 are disposed at axially opposed positions of the field core 38 and the housing 4, the pair of rotation prevention portions may be disposed on the outer periphery of the field core and the inner periphery of the housing. For example, the pair of rotation prevention portions may have a protrusion-recess fitting structure, such as spline fitting, serration fitting, and key fitting, that is formed on the outer tubular portion of the field core and the inner periphery of the housing.

A retaining ring 44 limits movement of the field core 38 in the other axial direction relative to the housing 4. The retaining ring 44 is attached to a retaining ring groove formed on the inner periphery of the housing 4, and configured to axially abut the outer tubular portion of the field core 38.

The field core 38 is capable of directly contacting the armature 33 at the distal end surfaces of the inner and outer tubular portions, i.e., their end surfaces on the other axial side which axially face the armature 33.

A bearing 45 is disposed between the field core 38 and the shaft S. The bearing 45 is attached to the inner periphery of the inner tubular portion of the field core 38. The bearing 45 rotatably supports the shaft S relative to the field core 38.

The separation spring 35 is disposed between the surfaces of the armature 33 and the field core 38 that face each other. The amount of separation in the axial direction of the armature 33 from the field core 38 is limited by the retaining ring 46. While the retaining ring 46 is used also to restrict movement of the spring retaining ring 29, a separate retaining ring may be used for this purpose.

The operation of the clutch mechanism 3 will be described (see FIGS. 1 to 3 as appropriate). In the below description, it is assumed that the shaft S is an input shaft. While the electromagnetic coil 39 of the electromagnetic actuator 24 is de-energized, the engaging elements 21 are in the neutral position, and the cage 22 is retained, by the spring force of the switch spring 23, in the phase in which the engaging elements 21 are kept in the neutral position with respect to the cam surfaces 20. Therefore, even when the shaft S rotates clockwise or counterclockwise in FIG. 2, rotational torque of the inner member 1, which rotates in unison with the shaft S, is not transmitted to the outer member 2, so that the inner member 1 idles (freely rotates) relative to the outer member 2. That is, the clutch mechanism 3 is in a disengaged state in which the transmission of rotational torque from the inner member 1 to the outer member 2 is blocked.

In this disengaged state, rotation of the inner member 1 is transmitted to the cage 22 via the switch spring 23, so that the cage 22 and the engaging elements 21 rotate together. Since the armature 33 is rotationally fixed relative to the cage 22, the armature 33 also rotates together.

When the electromagnetic coil 39 is energized while the inner member 1 is rotating, attraction force is applied to the armature 33. Therefore, the armature 33 moves against elasticity of the separation spring 35 and is directly magnetically attracted to the electromagnet 34.

At this time, frictional resistance between the surfaces of the field core 38 of the electromagnet 34 and the armature 33 that are attracted to each other acts as rotation resistance of the cage 22. This frictional resistance is set in advance to a value larger than the spring force of the switch spring 23. Therefore, the switch spring 23 is elastically deformed, and the cage 22 rotates relative to the inner member 1. Due to this relative rotation, the engaging elements 21 are pushed into narrow portions of the respective wedge spaces between the cylindrical surface 19 and the cam surfaces 20, and engage the cylindrical surface 19 and the cam surfaces 20. As a result, rotational torque of the inner member 1 is transmitted to the outer member 2 via the engaging elements 21. That is, the clutch mechanism 3 is switched to an engaged state in which rotational torque is transmitted from the inner member 1 to the outer member 2.

When, in this engaged state, the electromagnetic coil 39 is de-energized, the armature 33 is separated from the electromagnet 34 and moves to a position where the armature 33 abuts the retaining ring 46, by the pressing force of the separation spring 35. When the armature 33 is separated from the electromagnet 34, the spring force of the switch spring 23 causes the cage 22 to rotate relative to the inner member 1 in the direction opposite to the direction when moved to the engaged position, so that the engaging elements 21 are pushed by the pillars 25 and return to the neutral position. The clutch mechanism 3 thus returns to the disengaged state.

If rotational torque is inputted to the shaft portion 8 of the outer member 2, that is, if the shaft portion 8 is used as an input shaft, when the rotational torque is inputted to the shaft portion 8 with the clutch mechanism 3 disengaged, the outer member 2, the housing 4, and the electromagnet 34 all rotate freely. When the electromagnetic coil 39 is energized while the outer member 2 is rotating, the armature 33 is, in the same manner as above, directly magnetically attracted to the field core 38 of the electromagnet 34. Thus, the cage 22 is coupled to the outer member 2 via the armature 33 and the housing 4, and the inner member 1 and the cage 22 rotate relative to each other. Due to this relative rotation, the engaging elements 21 engage the cylindrical surface 19 of the outer member 2 and the cam surfaces 20 of the inner member 1, thus switching the clutch mechanism 3 to the engaged state. As a result, rotational torque of the outer member 2 is transmitted to the inner member 1 and the shaft S.

In this way, when the electromagnet 34 is energized, a series of torque transmission paths is formed between the inner member 1 and the outer member 2 by the clutch mechanism 3, and between the outer member 2 and the housing 4 by the pairs of engaging portions 12 and 13. Therefore, by connecting an output side of the device, i.e., its portion downstream of the clutch mechanism 3 with respect to the flow of energy, to a loaded member such as an external stationary member, movable member, or deformable member such that the output side is capable of resisting rotational torque transmitted from the input side via the clutch mechanism 3, it is possible to perform a first braking operation for stopping rotation of the input side, or a second braking operation for applying resistance force against rotation of the input side, by energizing the electromagnet 34.

If the rotation braking device shown in FIGS. 1 to 3 is used for the first braking operation, and if the shaft S is used as an input shaft (in which case the inner member 1 and the shaft S are on the input side, and the outer member 2 and the housing 4 are on the output side), at least one of the outer member 2 and the housing 4 is connected to a loaded member such as a machine frame so as not to be rotatable relative to the loaded member. Conversely, if, the outer member 2 and the housing 4 are used as members on the input side, the shaft S, which is on the output side, is connected to the loaded member so as not to be rotatable relative to the loaded member. In either case, when the clutch mechanism 3 is switched to the engaged state by energizing the electromagnet 34, rotation on the input side is stopped in a very short period of time by the resistance of the output side.

If the rotation braking device is used for the second braking operation in which, with the outer member 2 and the housing 4 rotationally fixed relative to each other, they rotate in unison with each other, this rotation has to be limited within a range where wiring 47 for energizing the electromagnetic coil 39 of the electromagnet 34 is not broken. Normally, by limiting rotation of the electromagnet 34 in unison with the housing 4 to 360° (one revolution), breakage of the wiring 47 is avoidable.

Thus, during the above-described first braking operation, or if the above-described second braking operation is performed such that the rotation angle of the outer member 2 is small, no limitless and continuous relative rotation occurs between the outer member 2 and the housing 4, and thus radially supporting the outer member on the housing via a rolling bearing will result in an excessive support structure. In contrast, in the rotation braking device shown in FIGS. 1 to 3, the outer member 2 is directly supported in the radial direction by the housing 4 at the spline fitting portion or the fitting portion of the circular outer peripheral portion 9 and the circular inner peripheral portion 10 described above, and thus the number of parts can be reduced.

Further, in the electromagnetic actuator 24, the armature 33 is directly magnetically attracted to the electromagnet 34. As a result, compared to a case where the armature is magnetically attracted via a rotor, magnetic force loss in the rotor is eliminated and magnetic attraction to the armature 33 is increased. Therefore, the rotation braking device shown in FIG. 1 to 3 shows improved responsiveness, which is important in the above-described first and second braking operations, and also, it is possible to reduce the number of parts. Since an air gap is formed only between the electromagnet 34 and the armature 33, it is possible to reduce dimensional variations of the air gap and stabilize the magnetic attraction force.

That is, in the rotation braking device shown in FIGS. 1 to 3, especially because the armature 33 is constituted by a movable member configured to be directly magnetically attracted to the electromagnet 34 by energizing the electromagnet 34; the outer member 2 is directly supported in the radial direction by the housing 4; and the outer member 2 and the housing 4 have pairs of engaging portions 12 and 13 that can engage each other so as to limit relative rotation of the outer member 2 and the housing 4, it is possible to reduce the number of parts of the rotation braking device, and thus its cost, and also provide good responsiveness. This rotation braking device is therefore suitable for use in the above-described first and second braking operations.

In the rotation braking device shown in FIGS. 1 to 3, because each pair of engaging portions 12 and 13 are composed of an engaging protrusion formed on one of the outer member 2 and the housing 4, and an engaging recess formed on the other, simply by forming protrusions and recesses on the housing 4 and the outer member, it is possible to prevent relative rotation between the housing 4 and the outer member 2, or limit such relative rotation to less than one revolution.

Further, in the rotation braking device shown in FIGS. 1 to 3, since the pairs of engaging portions 12 and 13 are disposed outwardly of the engaging elements 21, the engaged position (torque transmission position) of the engaging elements 21 and the outer member 2 and the engaged position (torque transmission position) of the outer member 2 and the housing 4 are aligned in the radial direction, so that twisting between these engaged portions can be avoided.

Further, in the rotation braking device shown in FIGS. 1 to 3, the field core 38 of the electromagnet 34 is supported by the housing 4, the field core 38 and the housing 4 have a pair of rotation prevention portions 42 and 43 which is fitted to each other such that the field core 38 and the housing 4 cannot rotate relative to each other, and the pair of rotation prevention portions 42 and 43 are composed of a fitting protrusion formed on one of the field core and the housing, and a fitting recess formed on the other. Therefore, simply by forming a protrusion and a recess on the housing 4 and the field core 38, it is possible to directly and non-rotatably support the electromagnet 34 with respect to the housing 4

Further, when the rotation braking device shown in FIGS. 1 to 3 is used for the above-described first braking operation or second braking operation, premature damage to the O-ring 11 due to relative rotation between the housing 4 and the outer member 2 is not a concern. By using an O-ring, having a simpler seal structure than an oil seal, it is possible to reduce the cost of the rotation braking device.

Further, in the rotation braking device shown in FIGS. 1 to 3, because the outer member 2 is directly supported in the radial direction by the housing 4, and the retaining ring 14 attached to the housing 4 and the outer member 2 are brought into contact with each other in the axial direction, compared to an anti-separation structure that restricts inner and outer rings of a rolling bearing disposed between the outer member and the housing with a retaining ring on the housing side and a retaining ring on the outer member side, separation of the outer member 2 from the housing 4 can be prevented with a simpler structure. Even though the rolling bearing between the outer member and the housing is omitted, it is possible to prevent separation of the outer member 2 from the housing 4.

Figure 4:
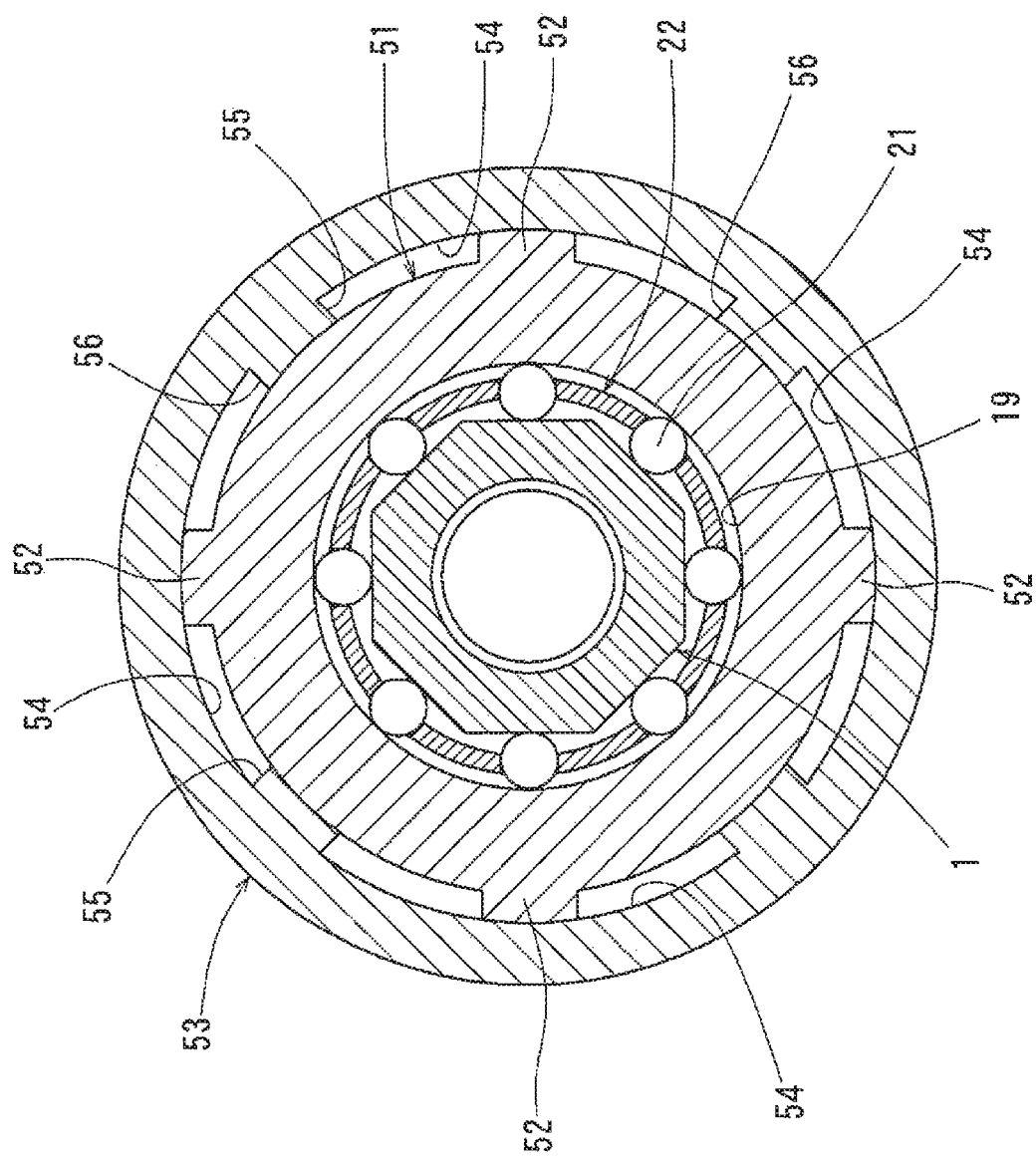
FIG. 4 is a sectional view showing a rotation braking device according to a second embodiment of the present invention.

In the first embodiment, the outer member 2 and the housing 4 are rotationally fixed relative to each other by the pairs of engaging portions 12 and 13. However, in order to address the desire not to stop rotation in a very short period of time during the first braking operation, by, for example, fixing only the housing to a stationary member/portion such as a machine frame, and allowing rotation of the outer member at a small rotation angle, it is possible to allow relative rotation between the outer member and the housing within less than one revolution. A second embodiment as such an example is shown in FIG. 4. In the following, only what differs from the first embodiment will be described.

The outer member 51 of the second embodiment shown in FIG. 4 has engaging portions 52 constituted by engaging protrusions disposed at 90° intervals. The housing 53 has engaging portions 54 constituted by four engaging recesses evenly disposed in the circumferential direction. One engaging portion 52 is inserted into each engaging portion 54. When the engaging elements 21 is in the neutral position, the engaging portions 52 are located at the circumferential centers of the respective engaging portions 54, and there are gaps between each engaging portion 52 and the circumferential end surfaces 55 and 56 of the corresponding engaging portion 54. Therefore, during the first or second braking operation in which the housing 53 is fixed to a stationary member, the inner member 1 and the outer member 51 can rotate relative to each other until each engaging portion 52 abuts one of the circumferential end surface 55 and 56 the corresponding engaging portion 54.

It should be understood that the embodiments disclosed are mere examples in every respect, and not restrictive. Therefore, the present invention is defined not by the above description but by the claims, and covers any modification within the scope of the claims, both literally and equivalently.

DESCRIPTION OF THE NUMERALS 1. inner member
2, 51. outer member
3. clutch mechanism
4, 53. housing
7. inner peripheral portion
11. O-ring
12, 13, 52, 54. engaging portion
14. retaining ring
21. engaging element
22. cage
24. electromagnetic actuator
33. armature
34. electromagnet
38. field core
42, 43. rotation prevention portion

What is claimed is:

1. A rotation braking device comprising:
an inner member;
an outer member having an inner peripheral portion disposed outside the inner member;
a clutch mechanism that selectively transmits and blocks rotational torque between the inner member and the outer member; and
a housing that houses the clutch mechanism,
wherein the clutch mechanism includes engaging elements disposed between the inner peripheral portion of the outer member and the inner member, a cage retaining the engaging elements, and an electromagnetic actuator that controls the clutch mechanism,
wherein the engaging elements are movable, by relative rotation of the cage, between an engaged position where the engaging elements engage the inner peripheral portion of the outer member and the inner member, and a neutral position where the engaging elements are disengaged from the inner peripheral portion of the outer member and the inner member,
wherein the electromagnetic actuator includes an armature rotationally fixed relative to the cage, and an electromagnet facing the armature,
wherein the electromagnet is rotationally fixed relative to the housing,
wherein the armature is a movable member configured to be directly magnetically attracted to the electromagnet by energizing the electromagnet,
wherein the outer member is directly supported in a radial direction by the housing, and
wherein the outer member and the housing include a pair of engaging portions engageable with each other so as to limit relative rotation of the outer member and the housing.

2. The rotation braking device according to claim 1, wherein the pair of engaging portions are constituted by an engaging protrusion formed on one of the outer member and the housing, and an engaging recess formed on the other of the outer member and the housing.

3. The rotation braking device according to claim 1, wherein the pair of engaging portions are disposed outwardly of the engaging elements.

4. The rotation braking device according to claim 3, wherein the pair of engaging portions are constituted by an engaging protrusion formed on one of the outer member and the housing, and an engaging recess formed on the other of the outer member and the housing.

5. The rotation braking device according to claim 1, wherein the electromagnet includes a field core supported by the housing, and the field core and the housing include a pair of rotation prevention portions fitted to each other so as not to be rotatable relative to each other, the pair of rotation prevention portions being constituted by a fitting protrusion formed on one of the field core and the housing, and a fitting recess formed on the other of the field core and the housing.

6. The rotation braking device according to claim 5, wherein the pair of engaging portions are constituted by an engaging protrusion formed on one of the outer member and the housing, and an engaging recess formed on the other of the outer member and the housing.

7. The rotation braking device according to claim 6, wherein the pair of engaging portions are disposed outwardly of the engaging elements.

8. The rotation braking device according to claim 5, wherein the pair of engaging portions are disposed outwardly of the engaging elements.

9. The rotation braking device according to claim 1, further comprising an O-ring that provides a seal between the housing and the outer member.

10. The rotation braking device according to claim 9, wherein the pair of engaging portions are constituted by an engaging protrusion formed on one of the outer member and the housing, and an engaging recess formed on the other of the outer member and the housing.

11. The rotation braking device according to claim 10, wherein the pair of engaging portions are disposed outwardly of the engaging elements.

12. The rotation braking device according to claim 10, wherein the electromagnet includes a field core supported by the housing, and the field core and the housing include a pair of rotation prevention portions fitted to each other so as not to be rotatable relative to each other, the pair of rotation prevention portions being constituted by a fitting protrusion formed on one of the field core and the housing, and a fitting recess formed on the other of the field core and the housing.

13. The rotation braking device according to claim 9, wherein the pair of engaging portions are disposed outwardly of the engaging elements.

14. The rotation braking device according to claim 13, wherein the electromagnet includes a field core supported by the housing, and the field core and the housing include a pair of rotation prevention portions fitted to each other so as not to be rotatable relative to each other, the pair of rotation prevention portions being constituted by a fitting protrusion formed on one of the field core and the housing, and a fitting recess formed on the other of the field core and the housing.

15. The rotation braking device according to claim 9, wherein the electromagnet includes a field core supported by the housing, and the field core and the housing include a pair of rotation prevention portions fitted to each other so as not to be rotatable relative to each other, the pair of rotation prevention portions being constituted by a fitting protrusion formed on one of the field core and the housing, and a fitting recess formed on the other of the field core and the housing.

16. The rotation braking device according to claim 1, further comprising a retaining ring attached to the housing and axially abutting the outer member.

17. The rotation braking device according to claim 16, wherein the pair of engaging portions are constituted by an engaging protrusion formed on one of the outer member and the housing, and an engaging recess formed on the other of the outer member and the housing.

18. The rotation braking device according to claim 17, wherein the pair of engaging portions are disposed outwardly of the engaging elements.

19. The rotation braking device according to claim 17, wherein the electromagnet includes a field core supported by the housing, and the field core and the housing include a pair of rotation prevention portions fitted to each other so as not to be rotatable relative to each other, the pair of rotation prevention portions being constituted by a fitting protrusion formed on one of the field core and the housing, and a fitting recess formed on the other of the field core and the housing.

20. The rotation braking device according to claim 16, wherein the pair of engaging portions are disposed outwardly of the engaging elements.

21. The rotation braking device according to claim 20, wherein the electromagnet includes a field core supported by the housing, and the field core and the housing include a pair of rotation prevention portions fitted to each other so as not to be rotatable relative to each other, the pair of rotation prevention portions being constituted by a fitting protrusion formed on one of the field core and the housing, and a fitting recess formed on the other of the field core and the housing.

22. The rotation braking device according to claim 16, wherein
the electromagnet includes a field core supported by the housing, and the field core and the housing include a pair of rotation prevention portions fitted to each other so as not to be rotatable relative to each other, the pair of rotation prevention portions being constituted by a fitting protrusion formed on one of the field core and the housing, and a fitting recess formed on the other of the field core and the housing.

* * * * *